United States Patent [19]

Stoner

[11] Patent Number: 4,466,107
[45] Date of Patent: Aug. 14, 1984

[54] DATA COMMUNICATION SYSTEM

[75] Inventor: Donald L. Stoner, Mercer Island, Wash.

[73] Assignee: The Microperipheral Corporation, Redmond, Wash.

[21] Appl. No.: 301,467

[22] Filed: Sep. 14, 1981

[51] Int. Cl.³ .............................................. H04B 1/38
[52] U.S. Cl. ...................................... 375/37; 328/167
[58] Field of Search .................... 375/8, 35, 36, 37, 82, 375/83, 84; 328/150, 167; 307/290; 370/32, 26, 89; 364/724

[56] References Cited

U.S. PATENT DOCUMENTS

| | | | |
|---|---|---|---|
| 3,324,398 | 6/1967 | Moore | 307/290 |
| 3,761,622 | 9/1973 | Stucklen | 375/37 |
| 3,793,486 | 2/1974 | Koziol | 179/2 DP |
| 4,006,465 | 2/1977 | Cross | 375/36 |
| 4,037,049 | 7/1977 | Lyon | 375/36 |
| 4,115,738 | 9/1978 | Mitarai et al. | 375/82 |
| 4,271,505 | 6/1981 | Menot et al. | 370/85 |

Primary Examiner—Robert L. Griffin
Assistant Examiner—Stephen Chin
Attorney, Agent, or Firm—Seed and Berry

[57] ABSTRACT

A data communication system in which a digital signal is applied directly to a limited bandwidth data link, such as a telephone line. Harmonies of the digital signal are attenuated either by a low-pass filter or by the limited bandwidth of the data link so that only the fundamental component of the digital signal passes through the data link. The resulting digital signal at the other end of the data link is differentiated and applied to a Schmidt trigger, which recreates the original digital signal. The data communication system may be connected to a digital device through an interface circuit which supplies appropriate signals for the serial I/O port of the digital device.

13 Claims, 2 Drawing Figures

DATA COMMUNICATION SYSTEM

TECHNICAL FIELD

This invention relates to modulator/demodulator systems (MODEMS) for digital data communication, and more particularly, to a MODEM which places digital data directly on a data link.

BACKGROUND ART

The need for high-speed transfer of digital data over communications lines and the national telephone network is well known. As the volume and expense of transferring such data increases, higher transfer speeds become even more desirable. Approximately 95% of the data presently transferred is done at 300 baud (approximately 30 characters/second). Modulator/demodulators (MODEMS) to convert digital data into signalling tones compatible with the telephone network and to convert the signalling tones back to digital data are used for transferring such data.

The primary disadvantage of conventional, relatively low-cost MODEMS is the slow speed at which data may be transferred. The limitation is more the fault of the telephone network than the MODEM since existing telephone networks have a limited bandwidth of around 2400 Hz. This relatively small bandwidth limits the speed at which data can be transferred by common frequency shift keying (FSK) and phase shift keying (PSK) techniques. More sophisticated signal processing techniques have been developed which allow data to be transferred at higher rates. However, MODEMS capable of processing the data in this sophisticated manner are relatively expensive and highly complex.

Another problem associated with data communication systems stems from the need to synchronize coding of the data at the sending station with decoding of the resulting tones at the receiving station. This is usually accomplished by sending a clock signal along with the data. Alternately, in asynchronous data communications, the digital message is precluded and followed by recognizable start and stop bits. Regardless of whether synchronous or asynchronous communication techniques are used, existing MODEMS are usually unable to operate properly if the frequency at which the data is transmitted is not accurately controlled.

Another problem associated with data communications systems arises from interfacing a large number of data terminals to a common data link. Each of the data terminals is capable of receiving and transmitting data at any time, and some system must be used to prevent two or more of them from transmitting on the data link at the same time. In the past, elaborate protocol systems have been used to accomplish this function.

DISCLOSURE OF INVENTION

It is an object of the invention to provide a data communication system which is capable of transferring digital data over a communications link at a relatively high speed.

It is another object of the invention to provide a high-speed data communication system which is relatively inexpensive.

It is another object of the invention to provide a relatively inexpensive and simple technique to allow a large number of digital devices to communicate over a common data link using the data communication system.

It is another object of the invention to provide a high-speed data communication system which is capable of operating at a widely varying frequency.

It is still another object of the invention to provide a data communication system which may be used in either a synchronous or asynchronous mode.

It is a further object of the invention to provide a high-speed data communication system which is compatible with the existing telephone network and produces no unwanted interference.

These and other objects of the invention are provided by a data communication system in which the digital data are applied directly to a data link having a predetermined bandwidth. The bandwidth of the data link is limited so that only the fundamental frequency components of the digital signal are placed on the data link, the harmonic frequency components being attenuated either by a discrete filter or by the filtering characteristics of the data link. The digital signal is reconstructed from the fundamental components on the data link, preferably by differentiating the signal on the data link and detecting zero crossings of the differentiated signal. The zero crossing detector may include a clipping amplifier having its output connected to a Schmidt trigger which responds to the incoming signal but does not respond to low-amplitude noise on the differentiated signal line. Each station of the data communication system includes a transmitter and receiver which are connected to the data link by a circuit that prevents the receiver from responding to transmitted signals. Specifically, an output amplifier is connected to the data link through an impedance while a differential receiver amplifier has one input connected to the output of the transmitter amplifier and the other input connected to the data link. As a result, both inputs of the differential amplifier receive transmitted signals, but only one input receives signals on the data link. The data communication system may interface with the serial port of a digital device, such as a computer or data terminal, through an interface circuit which allows data to be transmitted when no other station is transmitting data.

BEST MODE FOR CARRYING OUT THE INVENTION

Figure 1:
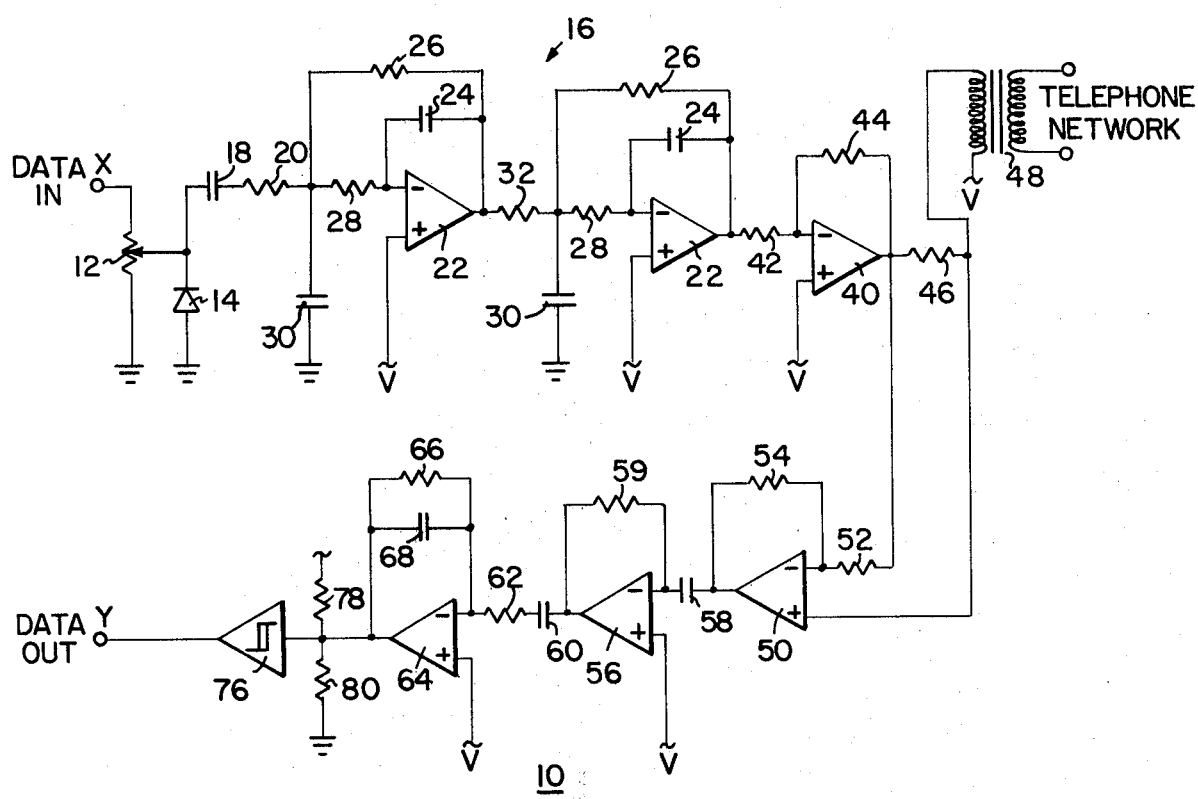
FIG. 1 is a schematic of the data communication system adapted for use with the existing telephone network.

The data communication system, as illustrated in FIG. 1, is connected to any device which generates digital data in serial form having fundamental frequency components which are less than the bandwidth of the data link. Such devices may include, for example, microprocessors and other computers, display terminals, television signals, or the like. Also, the digital signals may be either asynchronous, in which the message is identified by START and STOP bits, or synchronous, in which the data is identified by a clock signal which is generated either from the digital data itself or a separately supplied clock signal.

The data link may also assume a variety of forms. As illustrated in FIG. 1, the data link is a telephone network having a bandwidth of about 2400 Hz. Other data links with which the data communication system may be used include microwave facilities, satellite communication systems, or transmission lines. The speed of the data communication system will, of course, be affected by the bandwidth of the data link since a larger bandwidth will allow the digital data to have a higher maximum fundamental frequency component.

The digital data is applied to the system 10 through a potentiometer 12 which is adjusted to set the level of the incoming signal. The signal is then applied to the cathode of a diode 14 which clips negative-going signals. As a result, positive-going signals are applied to a low-pass filter 16 through a capacitor 18 and resistor 20, which act as a high-pass filter. This high-pass filter eliminates DC levels and low-frequency fluctuations from the incoming line. The low-pass filter consists of two Butterworth filters, each consisting of an operational amplifier 22, feedback capacitor 24, feedback resistor 26, summing resistor 28, and shunt capacitor 30. The output of the first operational amplifier 22 is connected to the input of the second operational amplifier 22 through a series resistor 32. For a data link having a 2400 Hz band width, the high-pass filter formed by capacitors 18 and resistor 20 and the low-pass filter 16 form a band-pass filter which may be between 300 and 2400 Hz. A data link having a 10 kHz bandpass would normally utilize a low-pass filter having a breakpoint of about 10 kHz. It will be understood, however, that, conceptually, it is not necessary to attenuate frequency components of the data signal which are above the bandwidth of the data link since the data link itself will attenuate these components. However, in practice, frequency components of the data signal which are above the bandwidth of the data link can cause interference with other lines. In any case, the breakpoint of the low-pass filter 16 should be below the lowest harmonic frequency component of the digital data so that only the fundamental components of the digital data are placed on the data link. And, of course, the breakpoint of the low-pass filter 16 must be greater than the highest fundamental frequency component so that all fundamental frequency components of the digital data are place on the data link.

The output of the low-pass filter 16 is applied to an operational amplifier 40 having summing and feedback resistors 42,44, respectively, to provide predetermined gain and a low output impedance. The output of amplifier 40 is applied to the data link through a resistor 46. In the case of the data link being formed by the existing telephone network, the input stage of the data link consists of an impedance matching transformer 48.

In operation, then, the fundamental frequency components of the digital signal, less its DC offset and low-frequency components, are applied to the telephone network impedance matching transformer 48. It is important to recognize that this technique is contrary to conventional wisdom which dictates that either the bandwidth of the data link be large enough to cover several of the harmonics of the digital data signal in order to preserve the leading and trailing edges of each pulse or that the digital data be converted to signalling tones.

The remainder of the data communication system, as illustrated in FIG. 1, receives the filtered digital signal on the data link and reconstructs the digital waveform. Accordingly, the incoming signal on the impedance matching transformer 48 is applied to the noninverting input of an operational amplifier 50, while the inverting input of operational amplifier 50 is connected to the output of amplifier 40 through resistor 52. The gain of amplifier 50 is set by feedback resistor 54. Since the noninverting input of amplifier 50 is connected to the output of amplifier 40 through resistor 46, both inputs of amplifier 50 receive any signal generated by amplifier 40. The common mode rejection of amplifier 50 is sufficiently high so that amplifier 50 does not react to outputs of amplifier 40. However, in the absence of a signal at the input of the data communication system, the output of amplifier 40 is normally about zero volts. Consequently, amplifier 50 responds to incoming digital data signals from transformer 48.

The output of amplifier 50 is applied to an active differentiator formed by operational amplifier 56, capacitor 58 and feedback resistor 59. The differentiator generates a signal having zero crossings which occur at the peaks of the received signal. This allows a zero crossing detector to be triggered by the differentiator at the peaks of the received signal. Triggering on the peaks of the received signal instead of on the zero crossings is important because the distance between the peaks, and not the zero crossings, accurately represents the transmitted digital waveform.

The output of the operational amplifier 56 is applied to a band pass filter formed by a series combination of capacitor 60 and resistor 62, amplifier 64, feedback resistor 66, and feedback capacitor 68. The band pass filter formed by these elements transfers the fundamental frequency components of the digital data signal while attenuating DC offsets, low-frequency signals, and high-frequency transients. The output of amplifier 64 is applied to a Schmidt trigger 76 having its input biased at half the supply voltage by voltage divider resistors 78,80. The signal at the output of the Schmidt trigger 76 is thus an accurate reproduction of the digital signal applied to the input of the system.

Although the data communication system is simple, it operates in a manner not heretofore recognized since, as mentioned above, conventional wisdom has always taught that a digital signal requires a relatively wide bandwidth. Moreover, it has not been recognized upon examining the fundamental components of the digital signal that the entire digital signal can be recovered from these fundamental components. As a result, the data communication system has the speed of highly sophisticated MODEMS without their complexity and expense.

Figure 2:
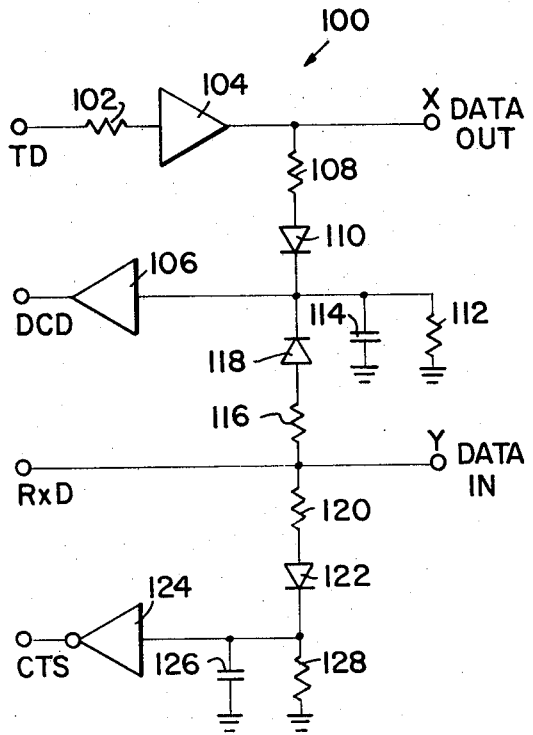
FIG. 2 is a schematic of an interface circuit for connecting the data communication system to the serial port of a digital device.

The data communication system may be used to connect a large number of digital devices to a common data link using the interface circuit illustrated in FIG. 2. These digital devices may include, for example, computers, data terminals and the like. The digital device is normally connected to the interface circuit through a serial I/O port, such as an RS-232 port. The digital device outputs digital data to the "data to be transmitted" (TD) port of the interface circuit, which is applied through resistor 102 to driver 104. The output of the driver 104 is connected to the DATA OUT terminal of the interface circuit, which is connected directly to the DATA IN terminal of the data communication system illustrated in FIG. 1.

The output of the driver 104 is also applied to the input of a second driver 106 through resistor 108 and diode 110. The input of driver 106 is normally held low through resistor 112, which is connected in parallel with capacitor 114. The combination of the capacitor 114 and the resistor 112 has a time constant on the order of two minutes. However, other time constants may be used.

When the digital device applies data to driver 104, the output of driver 104 goes high, thereby forward biasing diode 110 and charging capacitor 114 to a level which causes the output of driver 106 to go high. Driver 106 is connected to the "data carrier detect" (DCD) input of the digital device's serial port. A high DCD input is required for the digital device to recognize that it has gained access to a data link.

When the digital device stops applying data to the driver 104, capacitor 114 begins discharging through resistor 112, thereby causing the output of driver 106 to go low after a predetermined period. Thus the transmitting digital device is informed that it has captured the data link until it ceases to transmit for a predetermined period.

Data from the DATA OUT terminal of the communication system of FIG. 1 is applied to the DATA IN terminal of the interface circuit. This data is applied directly to the "received data" (R×D) output of the interface circuit and is received by the digital device. However, the data applied to the data input of the interface circuit is also applied to drive 106 through resistor 116 and diode 118 to cause the data carrier detect output to go high, thereby informing the digital device that it is to receive data from the data link. The data applied to the input of the interface circuit is also applied through resistor 120 and diode 122 to an inverter 124, which causes a "clear to send" (CTS) line to go low. A high CTS signal indicates to the digital device that the data link is clear so that it may apply digital data to the interface circuit. A low CTS signal, generated when data is already being received from the data link, prevents the digital devices from accessing the data link. The data applied to the data input of the interface circuit charges capacitor 126, which slowly discharges through resistor 128 after data is no longer present. Thus the "clear to send" output remains low for a predetermined period after data is no longer being received.

The interface circuit thus inexpensively and simply allows a large number of digital devices to communicate over a common data link through their respective data communication systems. Each digital device is capable of capturing the data link when the data link is not being accessed by any other digital device. After the transmitting digital device has completed its transmission, it then releases the data link a predetermined period later to allow it to be recaptured by the same or a different digital device. Although the interface circuit is illustrated in use with the inventive data communication system, it will be understood that it can also be used with other data communication devices.

I claim:

1. A system for communicating received digital signals over a bandwidth limited data link, the system comprising:
   a low-pass filter having an input for receiving a digital signal with a highest fundamental frequency component within said bandwidth, said filter having a cutoff frequency above said highest fundamental frequency component of said digital signal but below a lowest harmonic frequency component of said digital signal to produce a filtered signal corresponding to said digital singal, said filter having an output to apply said filtered signal to said bandwidth limited data link; and
   a detector for receiving said filtered signal from said data link, said detector processing said filtered signal to reconstruct said digital signal, whereby said digital signal can be transmitted over said data link without first being modulated and then reconstructed, and the rate of transmission of said digital signal can be increased as long as said highest fundamental frequency component of said digital signal is within said data link bandwidth.

2. The system of claim 1 wherein the cutoff frequency of said low-pass filter is substantially equal to the frequency of said predetermined bandwidth.

3. A system for transferring a digital signal over a data link having a predetermined bandwidth which is greater than the highest fundamental frequency component of said digital signal, said system comprising:
   low-pass filter means having an input receiving said digital signal and an output applied to said data link, said filter means having a cutoff frequency which is larger than the highest fundamental frequency component of said digital signal and less than the lowest harmonic frequency component of said digital signal, thereby applying a filtered signal to said data link; and
   a detector means receiving said filtered signal from said data link, said detector means processing said filtered signal to reconstruct said digital signal, said detector means including differentiator means receiving said filtered signal and generating an output signal that is the differential with respect to time of said filtered signal; and zero crossing detector means receiving the output of said differentiator means for generating as said reconstructed digital signal an output which changes state at the peaks of said filtered signal.

4. The system of claim 3 wherein said zero crossing detector means comprise Schmidt trigger means receiving the output of said differentiator means.

5. The system of claim 1 wherein said cutoff frequency is approximately equal to an upper bandwidth frequency limit of said data link.

6. The system of claim 5 wherein said cutoff frequency is approximately 2400 Hz.

7. A system for transferring a digital signal over a data link having a predetermined bandwidth which is greater than the highest fundamental frequency component of said digital signal, said system comprising:
   low-pass filter means having an input receiving said digital signal and an output applied to said data link, said filter means having a cutoff frequency which is larger than the highest fundamental frequency component of said digital signal and less than the lowest harmonic frequency component of said digital signal to produce a filtered signal;
   line driver means for applying said filtered signal to said data link through an impedance element; and
   detector means receiving said filtered signal from said data link, said detector means processing said filtered signal to reconstruct said digital signal, said detector means including differential amplifier means having one input connected to the output of said line driver means and the other input connected to said data link, whereby both inputs of said differential amplifier receive filtered signals generated by said line drive means to generate a zero output while only one input of said differential amplifier receives filtered signals from said data link to generate said filtered signal at its output.

8. A system for transferring a digital signal over a data link having a predetermined bandwidth which is greater than the highest fundamental frequency component of said digital signal, said system comprising:

low-pass filter means having an input receiving said digital signal and an output applied to said data link, said filter means having a cutoff frequency which is larger than the highest fundamental frequency component of said digital signal and less than the lowest harmonic frequency component of said digital signal, thereby applying a filtered signal to said data link; and detector means receiving said filtered signal from said data link, said detector means processing said filtered signal to reconstruct said digital signal, and interface circuit means for allowing said data communication system to communicate with a digital device having a serial input/output port, including a data output line, a data input line, a "data carrier detect" line for indicating that a digital device has been connected to said data link, and a "clear to send" line indicating that said data link is clear of transmissions from any digital device, said interface circuit comprising means connected to said data input line and said data output line for actuating said "data carrier detect" line when data is applied to said data input line and when data is applied to said output line, and means connected to said data input line for actuating said "clear" to send" line when data is applied to said data input line.

9. The data communication system of claim 8, further including means for continuing to actuate said "data carrier detect" line and said "clear to send" line for a predetermined period after data is no longer present on said data input and said data output lines.

10. A method for communicating received digital signals over a bandwidth limited data link, said method comprising:

selecting a digital signal with a transmission rate providing a highest fundamental frequency component within said bandwidth and a lowest harmonic frequency component outside said bandwidth;

applying said digital signal directly to said bandwidth limited data link for said data link to filter out said lowest harmonic frequency component and all higher frequency components of said digital signal and produce a filtered signal, and for transmitting said filtered signal over said data link;

receiving said filtered signal transmitted over said data link; and processing said filtered signal to reconstruct said digital signal.

11. The method of claim 10, further including the step of attenuating any harmonic frequency component of said digital signal that is greater than said predetermined bandwidth prior to applying said digital signal to said bandwidth limited data link.

12. The method of claim 11 wherein the filtered signal on said data link is processed by generating a digital signal representation of the distance between the peaks of said filtered signal.

13. A method of transferring a digital signal over a data link having a predetermined bandwidth which is larger than the highest fundamental frequency component of said digital signal, said method comprising:

attenuating any harmonic frequency component of said digital signal that is greater than said predetermined bandwidth;

applying said data signal directly to one end of said data link; and processing the signal on the other end of said data link to reconstruct said digital signal, said processing including differentiating said signal with respect to time and detecting the zero crossings of said differentiated signal.

* * * * *